Sept. 12, 1939.    E. W. RIFFEY ET AL    2,172,520
INTERNAL COMBUSTION ENGINE
Filed June 7, 1938    2 Sheets-Sheet 1
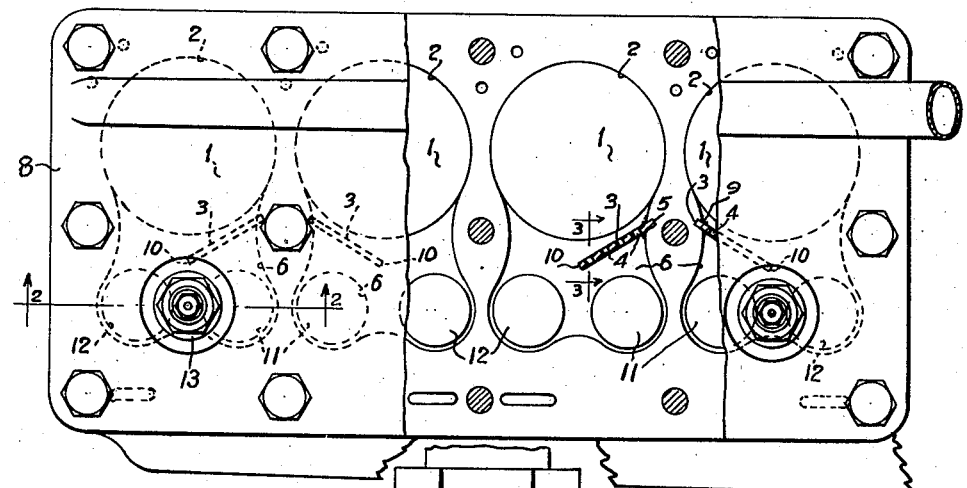
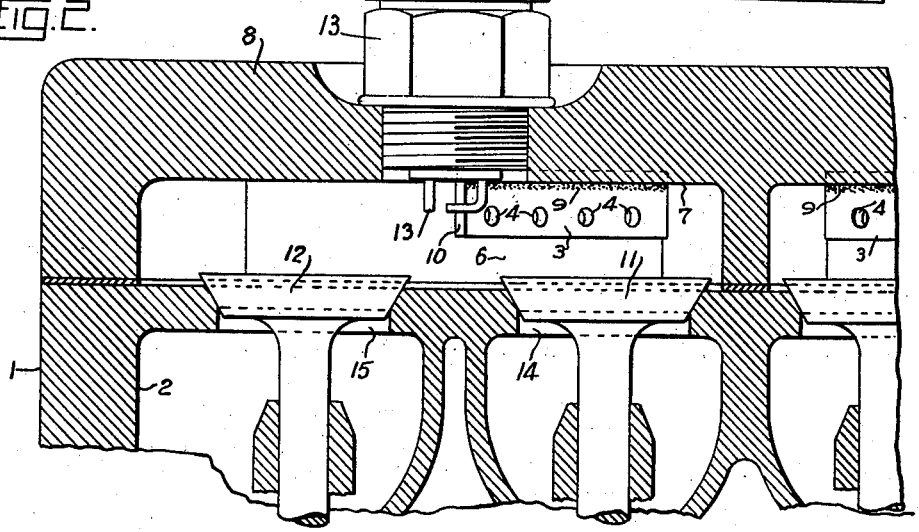
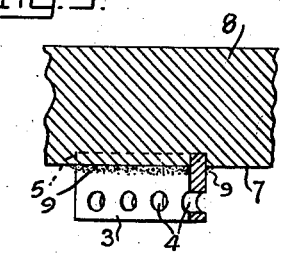
Inventors
EDGAR W. RIFFEY,
VIRGIL H. KIRKHAM,

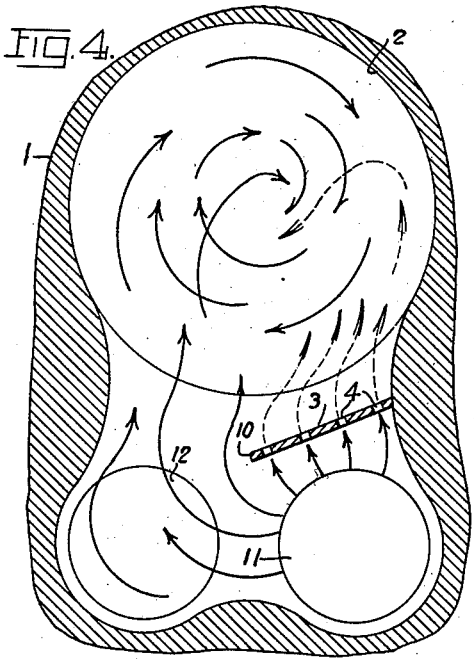
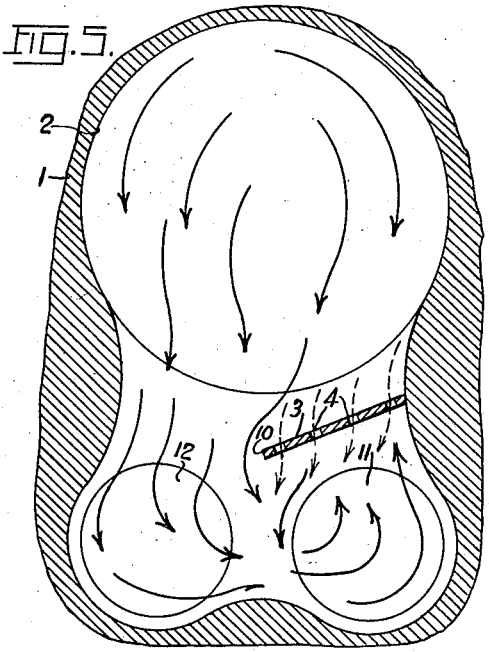
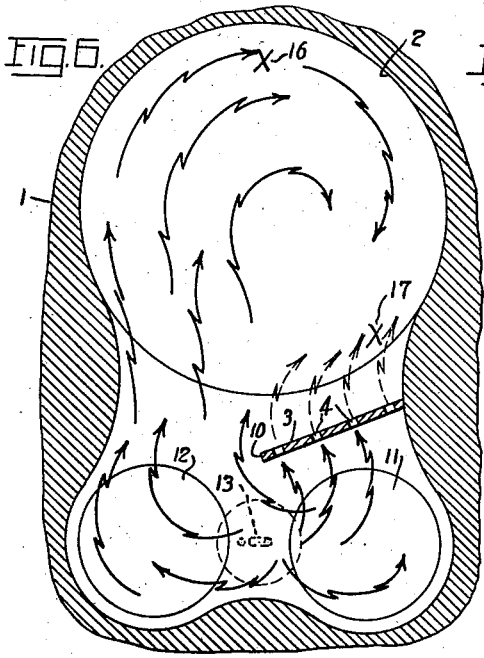
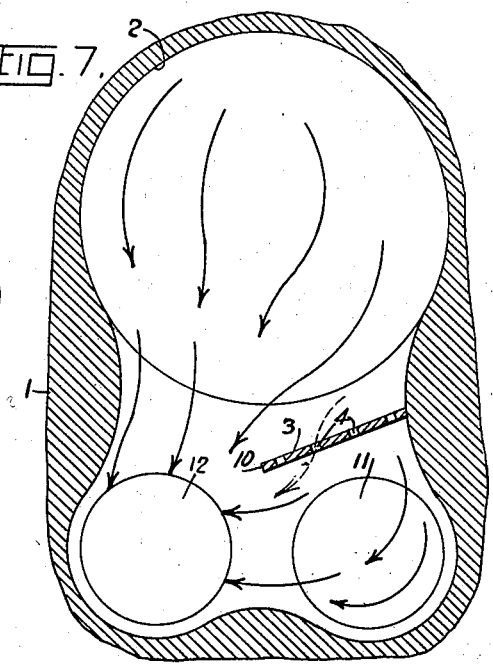

Patented Sept. 12, 1939

2,172,520

UNITED STATES PATENT OFFICE 2,172,520

INTERNAL COMBUSTION ENGINE

Edgar W. Riffey and Virgil H. Kirkham, Springfield, Ohio

Application June 7, 1938, Serial No. 212,314

6 Claims. (Cl. 123—191)

This invention relates to internal combustion engines and particularly to a means and method of preventing detonation and knocking in the engine.

It is an object of this invention to provide means of reducing detonation, increasing mileage gained from an automobile driven with the engine and to provide means of raising the temperature of the intake valve and of reducing the temperature of the exhaust valve.

It is an object of this invention to provide means for creating a high turbulence within the cylinder after the intake valve is closed.

It is an object of this invention to preheat the charge to a higher temperature through bringing about a more complete combustion of the charge.

It is a further object of this invention to provide different velocities of the currents in the charge within the cylinder to cause turbulence through the existence of dissimilar gas velocities on different sides of the cylinder.

It is an object of this invention to so arrange the movement of the incoming charge that it passes over the exhaust valve to insure that the heavy particles of fuel are preheated and vaporized by the heat of the exhaust valve. This also serves to cool the exhaust valve.

It is a further object of this invention to provide means of causing a turbulence to be set up over the intake valve to still further atomize the gas. The turbulence over hot gases raises the temperature of the intake valve, facilitating the preheating of the incoming cold gas.

It is a further object of this invention to facilitate a shifting in the point of complete flame propagation so as to reduce detonation.

It is an additional object of this invention to direct the flow of exhaust gases toward the exhaust and to eliminate pocketing such gases in the area of the intake valve.

Referring to the drawings:

Figure 1 is a top plan view of an internal combustion engine with the head partially broken away.

Figure 2 is a section on the line 2—2 looking in the direction of the arrows on Figure 1.

Figure 3 is a section on the line 3—3 of Figure 1, looking in the direction of the arrows.

Figure 4 is a diagrammatic view of the intake, exhaust and cylinder areas within the cylinder head showing the location of the baffle. The arrows and full lines show the high velocity gas currents. The arrows with the dotted lines show the low velocity gas currents. This is a condition on the intake stroke.

Figure 5 is a similar view showing the condition on the compression stroke.

Figure 6 is a similar view showing the condition on the power stroke.

Figure 7 is a similar view showing the condition on the exhaust stroke.

Referring to the drawings in detail, the fundamental idea underlying this invention is that provision of a perforated baffle disposed at an angle to the intake port between the intake port and the cylinder and extending from the cylinder wall adjacent to the intake port toward the exhaust port.

It is further found desirable to locate the spark plug between the intake and exhaust ports and adjacent the outer or free end of the baffle.

In the drawings, 1 designates a cylinder, the wall of which is designated 2. 3 designates a perforated plate having holes 4. This plate is anchored at one end, as at 5, in the wall of the intake chamber 6. It is supported from the top 7 of the cylinder head 8 by being inserted in a groove therein and welded thereto by the welding 9. This plate preferably extends downwardly about fifty percent of the depth of the chamber 6. The exact angular position depends upon the size of the motor and its speed.

It will be noted that the free outer end 10 of the plate 3 is about half way between the intake valve 11 and exhaust valve 12. The spark plug 13 is located between these valves and their ports and are designated, respectively, 14 and 15.

The purpose of this perforated plate in front of the intake valve is to cause the incoming charge to be partially diverted to the left so that it sweeps over the hot exhaust port and exhaust valve, cooling that valve as it passes onward to the cylinder and utilizing the heat thus taken up to vaporize the incoming gas.

The further purpose is to cause high turbulence by restricting the area through which the incoming gas enters the cylinder and by directing the incoming gas to one side of the cylinder to cause the gas to rotate above and within the cylinder thus bringing about the desired turbulence, an even distribution of the gas and a more complete vaporization of it.

This movement of the gas therefore is in a clockwise direction. A portion of the gas passes through the holes 4 in spaced streams or currents of lower velocity and a portion passes beneath the depending baffle 3 so that its movement is at an angle to the rotary movement of the main body of the gas.

These lower velocity gas currents passing through the holes 4 co-mingle with the high velocity gas currents of the main body of gas to promote the turbulent condition so as to break up any level of heavy particles of fuel that tend to stratify in layers in the lower part of the gas body.

This movement will be seen from the arrows in Figure 4 where the full line arrows show the main body of high velocity gas currents and the dotted arrows show the low velocity gas currents passing through the holes 4, the latter currents having velocities of about two-tenths less than the high velocity currents.

In Figure 5 the condition of the engine is shown on the compression stroke. On compression, the baffle causes turbulence to be set up over the intake valve still further atomizing the gas. The baffle also becomes warm during operation and this serves to heat the incoming gas on the next cycle.

The center of turbulence lies generally on a line running back from the end 10 of the baffle 3 to a point between the intake and exhaust valves.

In Figure 6 is shown the condition during the power stroke. The irregular arrows represent the flame propagation of the ignited gas. The point of the flame in the conventional head usually terminates at about 16. By utilizing this invention the end of the flame extends to a point about 17 where it is met by the gases passing through and beneath the baffle 3.

We have found that this shifting of the point of propagation of the flame reduces detonation. The gas over the intake fires first as the richer gas is in this vicinity adjacent the spark plug 13.

In Figure 7 is shown the condition on the exhaust stroke. The angularly disposed baffle 3 directs the flow of exhaust gases toward the exhaust port 15. The baffle 3 also aids in preventing pocketing of gases in the area of the intake valve as the reduction of the area of movement of the gas beneath the baffle 3 increases the velocity in this area. The velocity of gas passing through this restricted area creates a partial vacuum in the intake area, facilitating scavenging of the area around the intake valve.

It will be understood that in stating the foregoing theories, that such statements are theory based upon such practical observations in the actual operation of this engine that we have been able to make, but we do not wish to be concluded by such observations or to have our invention limited by them in the event they are in error. They are reported for such guidance to those who have occasion to use this invention. We know that the provision of this baffle performs the results claimed in actual practice and we believe the results therefore are those stated heretofore.

It will be understood that we desire to comprehend within our invention such modifications as may be necessary to adapt it to varying conditions and uses.

Having thus fully described our invention, what we claim as new and desire to secure by Letters Patent is:

1. In an internal combustion engine, a cylinder having intake and exhaust ports, valves for said ports and an angularly disposed perforated baffle partially interposed between the intake valve and said cylinder.

2. In an internal combustion engine, a cylinder having intake and exhaust ports, valves for said ports and an angularly disposed perforated baffle partially interposed between the intake valve and said cylinder, said baffle extending from the wall of the cylinder adjacent the intake valve to a point between the intake and exhaust valves and said cylinder.

3. In an internal combustion engine, a cylinder having intake and exhaust ports, valves for said ports and an angularly disposed perforated baffle partially interposed between the intake valve and said cylinder, said baffle extending from the wall of the cylinder adjacent the intake valve to a point between the intake and exhaust valves and said cylinder, said baffle being arranged at substantially right angles to a radius drawn from the center of said cylinder.

4. In combination, in an internal combustion engine, of a cylinder and cylinder head associated with a valve chamber, intake and exhaust valves controlling ports communicating with said chamber and said cylinder, and a diagonally disposed perforated baffle interposed between said intake port and said cylinder.

5. In combination, in an internal combustion engine, of a cylinder and cylinder head associated with a valve chamber, intake and exhaust valves controlling ports communicating with said chamber and said cylinder, and a diagonally disposed perforated baffle interposed between said intake port and said cylinder, said baffle being arranged to depend from the underside of the top of said cylinder head and to extend downwardly a part only of the depth of said chamber.

6. In combination, in an internal combustion engine, of a cylinder having a valve chamber with intake and exhaust ports therein, valves therefor and a diagonally disposed perforated plate depending from the ceiling of said chamber and extending partly to the floor thereof but spaced therefrom and located angularly between said intake port and said cylinder, and a spark plug located between said intake and exhaust ports and the end of said perforated plate.

EDGAR W. RIFFEY.
VIRGIL H. KIRKHAM.